United States Patent
Knoll et al.

(10) Patent No.: US 6,327,764 B1
(45) Date of Patent: Dec. 11, 2001

(54) METHOD OF INSTALLING AND ASSEMBLING A FLIP UP PITOT ASSEMBLY TO AN EJECTION SEAT

(75) Inventors: Frank Knoll, Huntington Station; Dominic Spinosa, Wantagh, both of NY (US)

(73) Assignee: East/West Industries, Inc., Ronkonkoma, NY (US)

( * ) Notice: Subject to any disclaimer, the term of this patent is extended or adjusted under 35 U.S.C. 154(b) by 0 days.

(21) Appl. No.: 09/530,126

(22) PCT Filed: Aug. 25, 1999

(86) PCT No.: PCT/US99/19503

§ 371 Date: Jul. 26, 2000

§ 102(e) Date: Jul. 26, 2000

(87) PCT Pub. No.: WO00/21829

PCT Pub. Date: Apr. 20, 2000

Related U.S. Application Data

(60) Provisional application No. 60/098,112, filed on Aug. 27, 1998.

(51) Int. Cl.[7] ............................. B23P 11/00; B64D 25/10; B21K 21/16

(52) U.S. Cl. ................... 29/401.1; 29/434; 244/122 AH

(58) Field of Search .................................. 29/401.1, 434; 244/122 AH, 122 A, 122 AE, 147, 150

(56) References Cited

U.S. PATENT DOCUMENTS

| 3,791,610 | 2/1974 | Garrett et al. . |
| 3,802,651 | 4/1974 | Axenborg et al. . |
| 3,862,731 | 1/1975 | McIntyre . |
| 4,057,206 | 11/1977 | Duncan et al. . |
| 4,448,374 | 5/1984 | Duncan . |
| 4,505,444 | 3/1985 | Martin . |
| 4,603,823 | 8/1986 | Ayoub . |
| 4,792,903 | 12/1988 | Peck et al. . |
| 5,104,066 | 4/1992 | Aronne . |

*Primary Examiner*—David P. Bryant
(74) *Attorney, Agent, or Firm*—Cahn & Samuels, LLP

(57) ABSTRACT

A method of assembling and installing a flip-up pitots system in an ejection seat. A flip-up pitot mount may be fastened to any existing recovery parachute container assembly. Mounting holes are created for the various parts that comprise the flip-up pitots system using the sub-parts as templates. The flip-up pitot system sub-parts are then easily installed on the recovery parachute container assembly irrespective of the make or model of the recovery parachute container assembly.

5 Claims, 5 Drawing Sheets

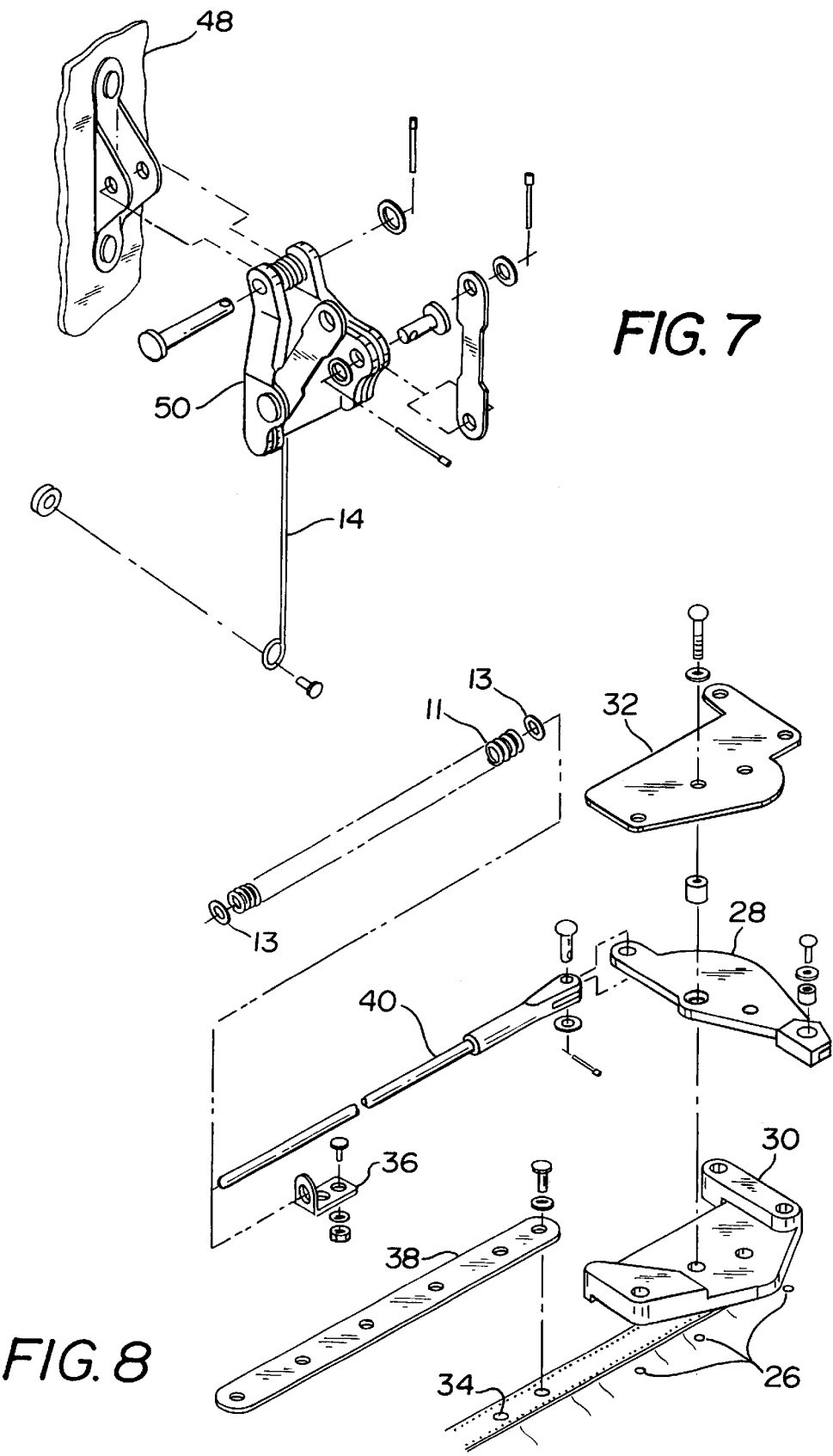

METHOD OF INSTALLING AND ASSEMBLING A FLIP UP PITOT ASSEMBLY TO AN EJECTION SEAT

This application is a 371 of PCT/US99/19503, filed Aug. 25, 1999, which claims benefit to U.S. provisional application Ser. No. 60/098,112, filed Aug. 27, 1998.

TECHNICAL FIELD

The present invention is directed to the field of aircraft ejection seats, More particularly, the present invention is directed to a method of installing and assembling a flip-up pitot to an ejection seat.

BACKGROUND ART

In the era of the 1980's, state-of-the-art aircrew ensembles, such as, helmet-mounted displays, night vision systems, and chemical/biological defense gear, were introduced. The increased envelope of these ensembles renewed concern about the need for the flip-up pitots system. Investigations focusing on the increased size of the helmet envelope, and its aerodynamic interference with fixed pitots airspeed inlets, proved that improper function of the Ejection Seat Sequencer could occur (John B. Arnaiz, Gentex Corporation, "Helmet Assembly Aerodynamic Interference Effects on ACES II Ejection Seat Operation," SAFE PROCEEDINGS 1985). These investigations, coupled with aircrew complaints of helmet interference and vision difficulties with fixed pitots system, increased interest in upgrading ejection seats, particularly the ACES II Ejection Seat, with a flip-up pitots system.

ACES II Ejection Seat escape performance depends entirely on the Pitots System, the "airspeed sensor" of the ejection seat, which provides critical airspeed environmental data to the seat's electronic recovery sequencer upon ejection.

As depicted in FIG. 1, ACES II pitots systems utilize two (2) pitots tubes 10 mounted on the left and right hand sides of the recovery parachute container assembly 12, located behind the headrest. They are oriented such that the open ends (airspeed inlets) face into the air stream. Pitots are designed to determine the seat's actual airspeed upon ejection, allowing correct mode selection to occur. As the ACES II Ejection Seat travels up the guide rails during an ejection and as the seat exits the cockpit, the pitots become exposed to the air stream and collect critical airspeed pressure data. The Pitots System of the ACES II Ejection Seat is used to control critical ejection seat and recovery system event timing, based on its airspeed input data, which is sent to an environmental sensor and then to a recovery sequencer. The recovery sequencer then selects one of three specific ejection modes dependent on altitude and speed at the start of the ejection sequence. It is the pitots system input data which determines one of three ejection modes for the seat. These inputs allow a recovery sequencer to select an ejection mode that provides for safe recovery of the aircrew member in the actual escape conditions.

Fixed pitots systems are mounted to the recovery parachute container assembly in a stationary position so that they are always deployed, even when they are not operational, as depicted in FIG. 1. Because Fixed Pitots are always deployed, their configuration is limited and governed by clearances with the surrounding cockpit structure. The two fixed pitots 14 typically have only a 16-inch (40 cm) span between the extended sensing ports of the right and left pitots. In addition, each of the pitots is oriented at an angle of 65 degrees up from vertical, locating the sensing port in the proximity of turbulent airflow around the Aircrew member's helmet. This arrangement compromises the critical pitots airspeed input data to the Recovery sequencer, which places the ejecting aircrew in risk of injury or death from incorrect ejection mode selection due to incorrect critical pitots airspeed input data.

In contrast, as shown in FIG. 2, flip-up pitots systems are mounted near the top of the recovery parachute container assembly. While FIG. 2 depicts the flip-up pitots in their deployment position, typically they remain in a stowed configuration until an ejection occurs and they are deployed. This stowed configuration provides many advantages: the stowed pitots remain out of the rear vision area of aircrew members, it poses minimal risk of helmet impact and it is also protected from inadvertent damage during servicing operations. During an ejection, the flip-up pitots deploy into the free air stream as the seat travels up the rails. The deployed flip-up pitots configuration has a greater outboard span of 22 inches (55 cm) between the extended airspeed inlet ports of the right and left pitots and an angle of 100 degrees upward position from vertical, locating the sensing ports in a much cleaner air stream away from the aircrew member's helmet. During seat ejection, as the seat travels up the rails, flip-up pitots deployment starts when a spring-loaded bellcrank mounted on the Recovery parachute container assembly moves up past the end of the guide rails. This allows the bellcrank to rotate which pulls a locking pin from the stowed Pitots. A torsion spring then rotates the pitots up until it becomes fully deployed and locked in that position.

In view of the foregoing, the United States Airforce (USAF) determined that fixed pitot systems are unacceptable for general use. In addition, flight personnel and aircrew and maintenance personnel complained that Fixed Pitots interfere with aircrew ability to "check six" (over the shoulder rearward vision) during air combat maneuvers.

The flip-up pitots system was designed as a complete recovery parachute container assembly replacement. Initial production of flip-up pitots systems were installed on B-2 Aircraft. Follow-on flip-up pitots system production was then installed on in-production F-16 Aircraft starting with Block 40 and up. Fixed Pitots Systems in current operational aircraft were then identified by USAF to be replaced with flip-up pitots systems on an attrition basis. As a result of such gradual replacement, users are currently forced to replace the entire Recovery parachute container assembly in order to achieve compliance, a difficult and expensive proposition, especially in the current fiscal environment. The cost of this replacement flip-up pitots recovery parachute container assembly is approximately $4,000.00 per unit.

Thus, it is most desirable to exchange the Fixed Pitots with the flip-up pitots without replacing the recovery parachute container assembly.

DISCLOSURE OF THE INVENTION

It is the object of the present invention to provide a method of attaching a flip-up pitot assembly to an ejection seat that is quick and inexpensive.

It is a further object of the invention to provide a method for attaching a flip-up pitot to an ejection seat that may be easily carried out by a single individual.

It is still another object of the invention to replace a fixed pitot system on an ejection seat with a flip-up pitot system without replacing the recovery parachute container assembly.

These and other objects may be realized by a method of assembling and installing a flip-up pitot assembly in an ejection seat comprising:

fastening a flip-up pitot mount assembly to a recovery parachute container assembly of the ejection seat;

creating a plurality of spaced mounting holes on respective sides of the recovery parachute container assembly;

fastening a pitot release fitting to respective sides of the standard parachute container using fasteners that engage one or more of the plurality of mounting holes;

assembling a pitot release mechanism and fastening the pitot release mechanism to the recovery parachute container assembly using fasteners that engage one or more of the plurality of mounting holes;

coupling a pitot head member with a tee support positioned adjacent the recovery parachute container assembly;

locking the pitot head member in a stowed position;

aligning the tee support member substantially flush with a top edge of the recovery parachute container assembly;

creating a mounting hole in the recovery parachute container assembly using the tee support as a template;

unlocking the pitot head member and installing a torsion spring on a shaft of the flip-up pitot mount assembly;

fastening the tee support and pitot head member to the recovery parachute container assembly;

recoupling the pitot head member to the tee support; and locking the pitot head member in the stowed position.

BRIEF DESCRIPTION OF THE DRAWINGS

FIG. 7 illustrates an exploded view of the channel and link assembly of the flip-up pitot head assembly depicted in FIG. 6.

FIG. 8 shows an exploded view of the pitot release mechanism.

BEST MODE FOR CARRYING OUT THE ILLUSTRATED EMBODIMENT

Figure 1:
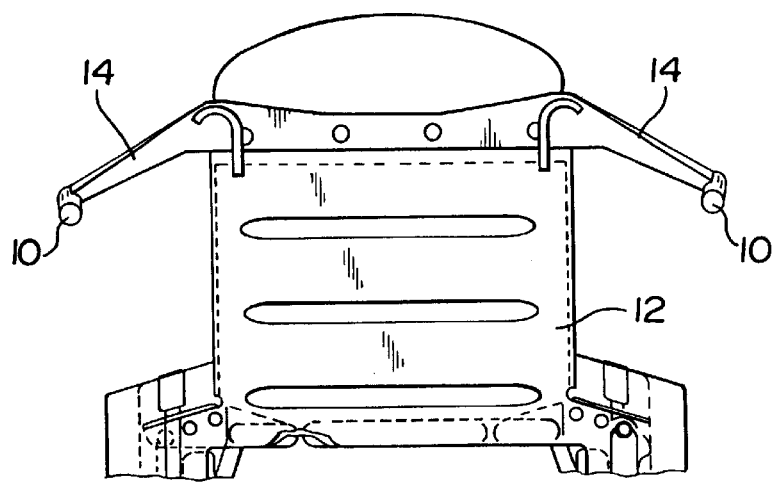
FIG. 1 shows the recovery parachute container of an ejection seat employing a conventional fixed pitots system.
Figure 2:
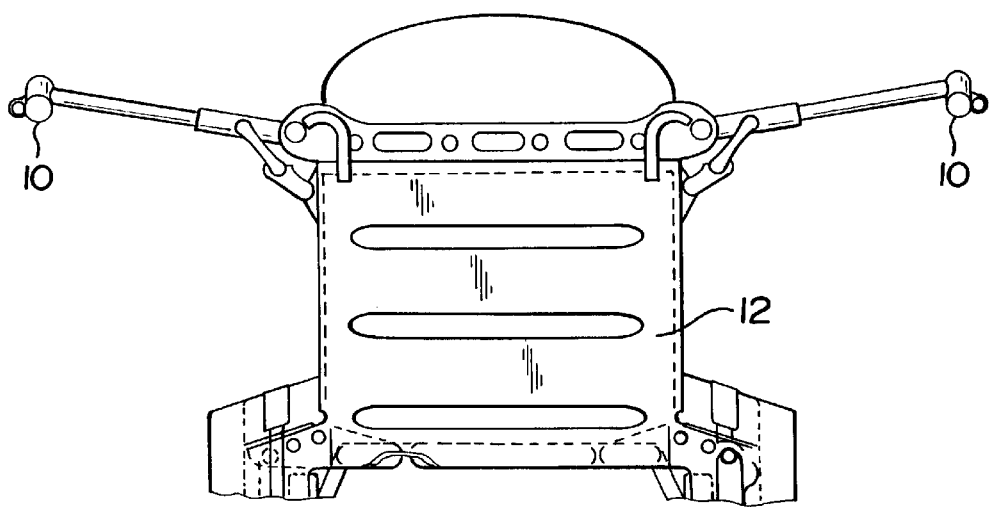
FIG. 2 illustrates the recovery parachute container of an ejection seat employing a conventional flip-up pitots system.
Figure 3:
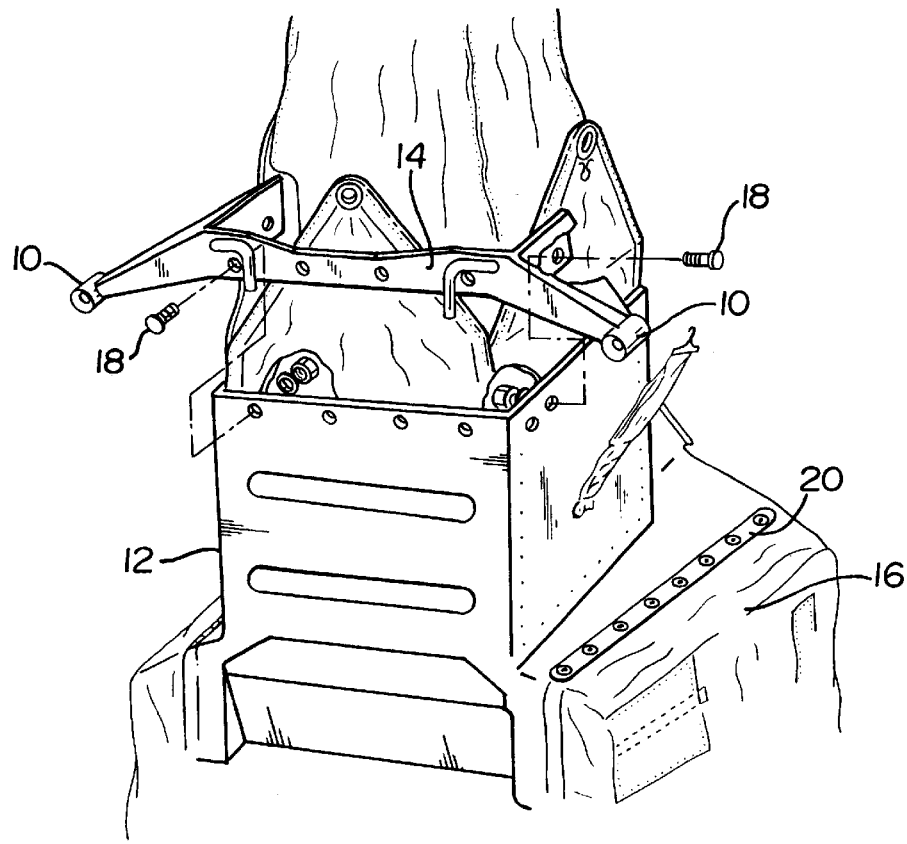
FIG. 3 depicts a recovery parachute container employing a conventional fixed pitots system.

FIG. 3 depicts an ejection seat having a standard fixed pitots system. The present invention relates to an efficient method for removing the fixed pitots system and replacing it with a flip-up pitots system without replacing the entire recovery parachute container assembly. Turning to FIG. 3, the fixed pitots system ejection seat depicted therein includes a fixed pitot assembly 14 attached to the top of the recovery parachute container assembly 12. In accordance with the method aspects of the invention, the fixed pitots assembly is preferably dissembled and removed from the recovery parachute container assembly, the parachute assembly is then cleaned and the flip-up pitots assembly is then attached to the parachute assembly.

In order to disassemble the fixed pitots assembly, the recovery parachute container 12 is unpacked by removing the recovery parachute and the mortar assembly (not shown) preferably in accordance with military standards, e.g., Safety Supplement T.O. 14D3-10-1. Typically the left-hand cover 16 of recovery parachute container assembly 12 is provided with a parachute logbook. If such a logbook is present, it should be removed and retained for re-installation. Next, the fixed pitots assembly 14 may be detached from the recovery parachute container assembly 12. This may be accomplished by removing screws 18 and any brackets used to secure fixed pitots assembly 14 to recovery parachute container assembly 12. Some existing structures that have not been reworked according to ECP-AC2-68 will include a combination of screws and rivets attaching the pitots to the parachute containers where the rivets must be removed to bring the assembly into compliance with the specification.

Figure 4:
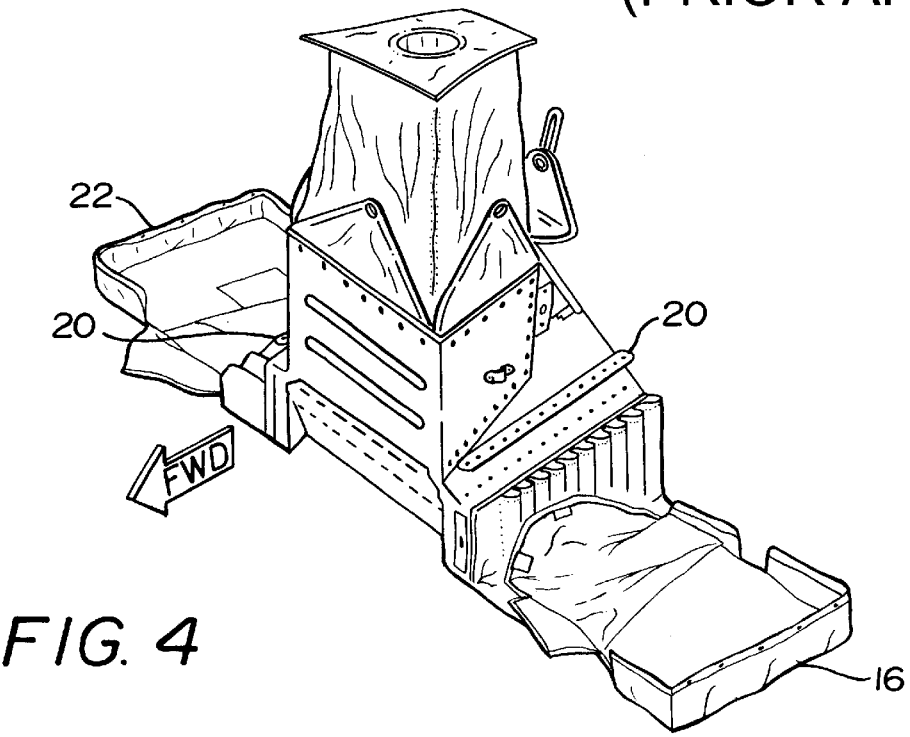
FIG. 4 shows a recovery parachute container in a partially disassembled condition.
Figure 5:
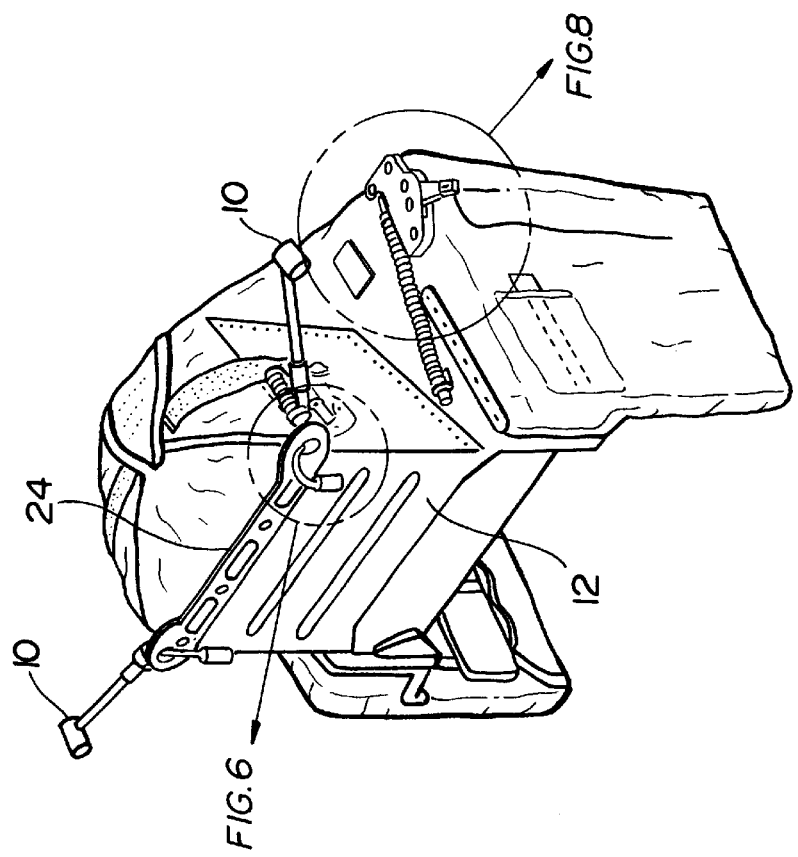
FIG. 5 illustrates a recovery parachute container employing a conventional flip-up pitots system.
Figure 6:
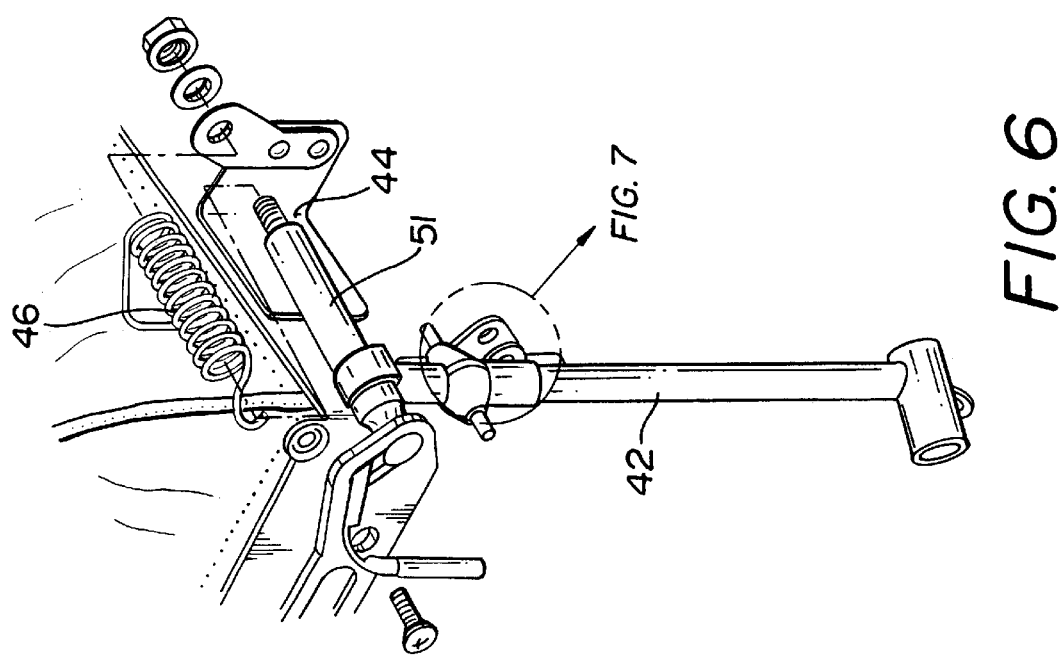
FIG. 6 depicts an exploded view of the flip-up pitot head assembly.

Retaining strips 20 are then removed from the recovery parachute container assembly 12. Subsequently, as illustrated in FIG. 4, left-hand cover 16 and right hand cover 22 are then removed and preferably retained for re-installation. No further disassembly is required.

At this point, recovery parachute container assembly 12 may be thoroughly cleaned of all metal chips, scraps, burrs and adhesive residue. A plastic scraper may be used to remove adhesive residue. An alcohol soaked cloth, for example, may be used to remove stubborn residue that cannot be removed with the scraper. Grade III or IV O-E-760 alcohol is preferred. The metal surfaces may be cleaned using an appropriate cleaner such as Scotchbrite® available from the Minnesota Mining and Manufacturing Company (3M). Preferably, recovery parachute container assembly 12 may then be treated with a cleaner such as Alodine, MIL-C-5541.

In keeping with the invention, after disassembly and cleaning, the flip-up pitots assembly is attached to recovery parachute container assembly 12. The attachment procedure is described with reference to FIGS. 5–9.

A flip-up pitot mount assembly 24 may be attached to the top of recovery parachute container assembly 12, e.g., as shown. The flip-up pitot mount assembly 24 is attached using a secure preferably mechanical attachment means such as screws, pins, rivets or bolts. On each side of recovery parachute container assembly 12, a plurality of appropriately spaced and positioned mounting holes 26 may be created for a bellcrank assembly 28, pitot release base latch 30 and pitot release cap latch 32. In addition, a plurality of appropriately spaced and positioned mounting holes (not depicted) for pitot release fitting 36 may be created as well as a plurality of appropriately spaced and positioned mounting holes 34 for strips 38. Mounting holes 26, 34 and the mounting holes for release fittings 36 may be created by positioning a drill template on each side of the recovery parachute container assembly 12 and drilling holes according to the template configuration. A preferred drill template is the T386D610-11/12 template manufactured by the present assignee.

Left and right covers 16 and 22, previously disassembled, may then be placed over the mounting holes for strip 38 on the recovery parachute container assembly 12. Strip 38 is then attached to the recovery parachute container assembly 12 by placing strip 38 over each cover and fastening the cover to the recovery parachute container assembly 12 using screws, bolts, rivets, pins or any other suitable fastener. After the left and right covers 16 and 22 are fastened, pitot release fittings 36 may be attached to the recovery parachute container assembly 12.

Following attachment of pitot release fittings 36, pitot release base 30 may be aligned over mounting holes in left and right covers 16 and 22 and recovery parachute container assembly 12. Prior to fastening pitot release base 30 to recovery parachute container assembly 12, pitot release rod assembly 40 with spring 11 and washers 13 assembled, may be inserted through the pitot release fitting 36 and attached to bellcrank assembly 28. Bellcrank assembly 28 may be aligned with pitot release base latch 30 and the pitot release cap 32 and the combination of bellcrank 28, pitot release base latch 30 and pitot release cap 32 may be fastened to recovery parachute container assembly 12 using a fastener that engages mounting holes 26 and 34. Suitable fasteners include screws, bolts, pins, rivets and equivalents thereof.

Next, pitot head assembly may be installed. Pitot head member 42 is temporarily coupled to tee support 44, positioned adjacent recovery parachute container assembly 12 and locked in the stowed position using pitot release rod 40. Tee support 44 may then be aligned such that a top edge is substantially flush with a top edge of recovery parachute container assembly 12. Tee support 44 may be held in place, e.g., mechanically or by hand, while a hole is created through the existing hole in a first leg of tee support 44 in a wall of recovery parachute container assembly wall 12, preferably by drilling using a number 10 drill bit. While tee support 44 is held in place, a hole may be created in a second leg of tee support 44 by, e.g., backdrilling from inside of recovery parachute container assembly 12 through an existing hole. Once the holes are created, tee support 44 may then be disassembled from pitot head member 42.

Further in the installation process of the pitot head assembly, pitot head member 42 may now be unstowed and a torsion spring 46 may be installed on a shaft 51 of flip-up pitot mount assembly 24. Tee support 44, channel 48 and link assembly 50 may then be fastened to recovery parachute container assembly 12. To facilitate fastening, channel 48 is preferably aligned along the side of recovery parachute container assembly 12. The location of the top hole in channel 48 is marked on the recovery parachute container assembly 12. A first channel mounting hole may be created in the recovery parachute container assembly at the marked location. Channel 48 may then be used as a guide to create additional channel mounting holes needed for installation of channel 48. Link assembly 50 may be aligned along the side of recovery parachute container assembly 12, coupled to channel 48 and appropriate link assembly spring 14 mounting holes may be created using link assembly 50 as a template. Pitot head member 42 may then be re-coupled to tee support 44 and locked in a stowed position.

Figure 9:
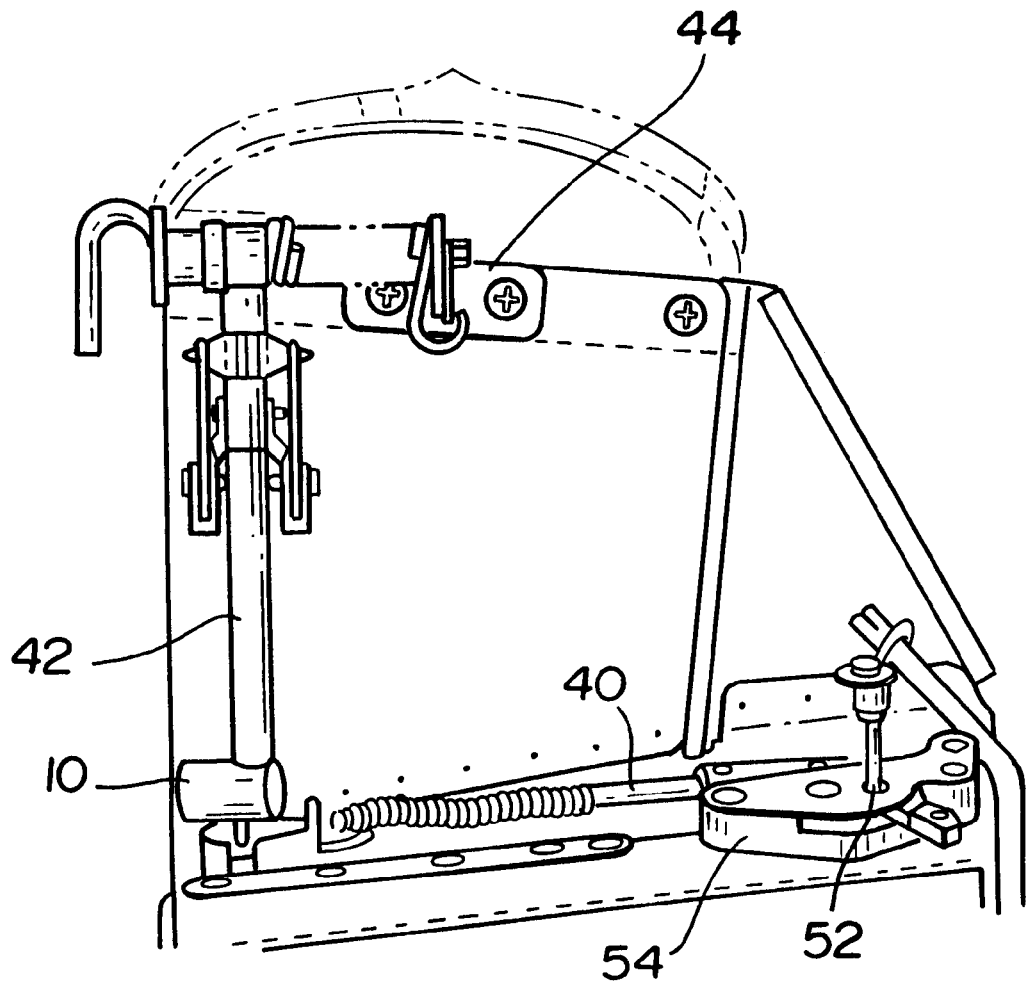
FIG. 9 depicts a side view of a recovery parachute container showing the ball lock safety pins and the pitot release mechanism.

After the pitot head assembly is installed ball lock safety pins 52 depicted in FIG. 9 may be installed to pitot release mechanism 54 to guard against accidental release of the pitot assembly. Lastly, the recovery parachute and the mortar assembly may be repacked in accordance with applicable military standards.

Industrial Applicability

The method according to the invention is particularly useful for aircraft personnel charged with upgrading existing ejection seats and/or recovery parachute containers that employ fixed pitots systems. The inventive method facilitates removal of fixed pitots systems and installation of flip-up pitots systems without replacing the recovery parachute container.

What is claimed is:

1. A method of assembling and installing a flip-up pitot assembly in an ejection seat comprising:

fastening a flip-up pitot mount assembly to a recovery parachute container assembly of the ejection seat;

creating a plurality of spaced mounting holes on respective sides of the recovery parachute container assembly;

fastening a pitot release fitting to respective sides of the standard parachute container using fasteners that engage one or more of the plurality of mounting holes;

assembling a pitot release mechanism and fastening the pitot release mechanism to the recovery parachute container assembly using fasteners that engage one or more of the plurality of mounting holes;

coupling a pitot head member with a tee support positioned adjacent the recovery parachute container assembly;

locking the pitot head member in a stowed position;

aligning the tee support member substantially flush with a top edge of the recovery parachute container assembly;

creating a mounting hole in the recovery parachute container assembly using the tee support as a template;

unlocking the pitot head member and installing a torsion spring on a shaft of the flip-up pitot mount assembly;

fastening the tee support and pitot head member to the recovery parachute container assembly;

recoupling the pitot head member to the tee support; and locking the pitot head member in the stowed position.

2. The method of claim 1 wherein the plurality of mounting holes are created using a drill template.

3. The method of claim 1 wherein assembling a pitot release mechanism includes:

inserting a pitot release rod through the pitot release fitting and coupling the pitot release rod with a bellcrank assembly, aligning a pitot release latch, the bellcrank assembly and a pitot release cap over the mounting holes, and fastening the bellcrank, the pitot release latch and the pitot release cap to the recovery parachute container assembly.

4. The method of claim 1 wherein fastening the pitot head member to the recovery parachute container assembly includes:

aligning a channel along a side of the recovery parachute container assembly, marking a location of a hole disposed in the channel on the recovery parachute container assembly, creating a first channel mounting hole in the recovery parachute container assembly at the location of the marking, creating additional channel mounting holes in the recovery parachute container assembly using the channel as a template, aligning a link assembly along the side of the recovery parachute container assembly, creating link assembly mounting holes in the recovery parachute container assembly, and fastening the channel and the link assembly to the recovery parachute container assembly.

5. The method of claim 4 wherein the link assembly includes a spring and at least one spring mountains hole where is the spring is fastened to the recovery parachute container assembly.

* * * * *